United States Patent
Egger et al.

(10) Patent No.: US 8,700,887 B2
(45) Date of Patent: Apr. 15, 2014

(54) REGISTER, PROCESSOR, AND METHOD OF CONTROLLING A PROCESSOR USING DATA TYPE INFORMATION

(75) Inventors: Bernhard Egger, Seoul (KR); Dong-Hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 12/895,366

(22) Filed: Sep. 30, 2010

(65) Prior Publication Data

US 2011/0231635 A1   Sep. 22, 2011

(30) Foreign Application Priority Data

Mar. 22, 2010  (KR) .................. 10-2010-0025352

(51) Int. Cl.
*G06F 9/34* (2006.01)
(52) U.S. Cl.
USPC .......................................... 712/220; 712/205
(58) Field of Classification Search
USPC ......................................... 712/220, 221, 205
See application file for complete search history.

(56) References Cited

U.S. PATENT DOCUMENTS

| | | | |
|---|---|---|---|
| 4,135,242 A * | 1/1979 | Ward et al. ................. | 712/245 |
| 4,491,908 A * | 1/1985 | Woods et al. ............... | 712/210 |
| 6,195,746 B1 | 2/2001 | Nair | |
| 6,351,806 B1 * | 2/2002 | Wyland ...................... | 712/225 |
| 2004/0024992 A1 * | 2/2004 | Ku ............................. | 712/210 |
| 2006/0179285 A1 | 8/2006 | Bekooij | |
| 2007/0113047 A1 | 5/2007 | Garg et al. | |
| 2009/0276432 A1 | 11/2009 | Hokenek et al. | |
| 2010/0042812 A1 * | 2/2010 | Hickey et al. ............... | 712/208 |

FOREIGN PATENT DOCUMENTS

KR   10-2007-0097024   10/2007

* cited by examiner

*Primary Examiner* — Andrew Caldwell
*Assistant Examiner* — Yuqing Xiao
(74) *Attorney, Agent, or Firm* — NSIP Law

(57) ABSTRACT

A processor and a processor control method which efficiently perform an operation on data using a register, are provided. The register may include a data type field and a data field. The processor may generate the data type bits and store the generated data type bits in the data type field.

17 Claims, 8 Drawing Sheets

FIG. 3

| Data Size | Data Size bit |
|---|---|
| 8bit | 00 |
| 16bit | 01 |
| 24bit | 10 |
| 32bit | 11 |

REGISTER, PROCESSOR, AND METHOD OF CONTROLLING A PROCESSOR USING DATA TYPE INFORMATION

CROSS REFERENCE TO RELATED APPLICATION

This application claims the benefit under 35 U.S.C. §119 (a) of Korean Patent Application No. 10-2010-0025352, filed on Mar. 22, 2010, the entire disclosure of which is incorporated herein by reference for all purposes.

BACKGROUND

1. Field

The following description relates to a register that can store data and a technology for performing an operation using the data stored in the register.

2. Description of the Related Art

A processor processes an instruction in order to execute a program. The processor is often referred to as a central processing unit (CPU). The processor processes an instruction by fetching, interpreting, and executing the instruction, committing the execution result, and writing the committed result.

A processor includes a control device, an operation device, and a register. The control device interprets instructions of a program, and controls the operation device, the register, and an input/output device based on the contents of the interpreted instruction. The operation device can perform an arithmetic operation such as addition and subtraction, and a logical operation such as an AND operation and an OR operation. The register stores an instruction and data or the operation result. The size and number of registers may vary according to the type of a processor.

With the increased need for storing large amounts of data such as image data, methods for a processor to process a large amount of data within a short period of time are actively being researched.

SUMMARY

In one general aspect, there is provided a processor comprising a register comprising a data type field and a data field, and a control unit configured to generate data type bits to that indicate a data type, wherein the data type includes the size of the data and/or the signed/unsigned type of the data and to store the generated data type bits in the data type field.

When one piece of data is output as a result of an operation performed on data of a first type and data of a second type, the control unit may determine the data type of the output data based on the data types of the input data.

The control unit may store the output data in the data field and generate the data type bits of the output data based on the determined data type.

The control unit may generate the data type bits based on an instruction that has an explicitly or implicitly given data type.

The instruction may include at least one of an instruction for reading data of a given data type and storing the data in the data field, and an instruction for changing stored data to data of the requested given data type.

The data type bits may include at least one of data size bits indicating the size of the data and a signed/unsigned bit indicating whether the data is signed or unsigned.

The control unit may recognize the data type of data stored in the data field based on the data type bits.

In another aspect, there is provided a data field configured to store data, and a data type field, configured to store data type bits that indicate a data type of the data, wherein the data type includes the size of the data and/or the signed/unsigned state of the data.

The data type bits may include at least one of data size bits indicating the size of the data and a signed/unsigned bit indicating whether the data is signed or unsigned.

In another aspect, there is provided a method of controlling a processor, the method comprising generating data type bits to indicate a data type, wherein the data type includes the size of the data and/or the signed/unsigned state of data, and storing the generated data type bits in the data type field of a register.

When one piece of data is output as a result of an operation performed on data of a first type and data of a second type, and the generating of the data type bits may include determining the output data based on the data of the first type and the second type.

The generating of the data type bits may include storing the output data in a data field and generating data type bits to indicate the data type of the output data based on the determined data type.

The generating of the data type bits may include generating the data type bits based on an instruction that has an explicitly or implicitly given data type.

The instruction may include at least one of an instruction for reading data of a given data type and storing the data in the data field, and an instruction for changing stored data to data of the requested given data type.

The method may further comprise recognizing the data type of data stored in a data field based on the data type bits.

Other features and aspects may be apparent from the following description, the drawings, and the claims.

BRIEF DESCRIPTION OF THE DRAWINGS

FIG. 3 is an example of a table illustrating data size bits.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and structures may be omitted for increased clarity and conciseness.

Figure 1:
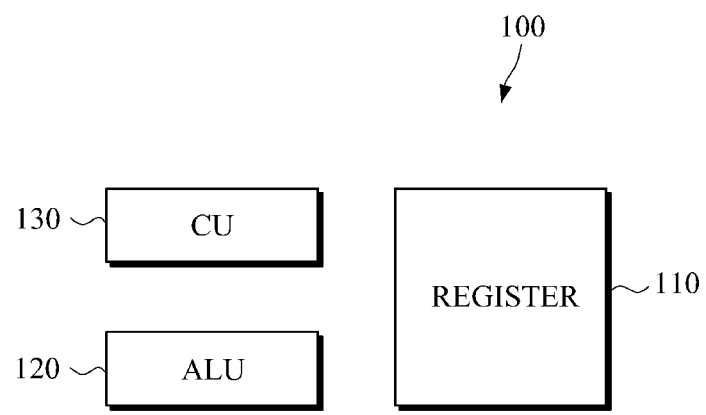
FIG. 1 is a diagram illustrating an example of a processor.

FIG. 1 illustrates an example of a processor. Referring to FIG. 1, processor 100 includes a register 110, an arithmetic logic unit (ALU) 120, and a control unit (CU) 130.

The register 110, the ALU 120, and the CU 130 may read and/or write data through a system bus. The system bus may include, for example, an address bus, a data bus, a control bus, and the like.

The register 110 may store an instruction or an operation result. Also, the register 110 may read data from a main memory (not shown) which stores data such as a program and the like. As an example, the register 110 may be divided into an address register, a program counter, a data register, an instruction register, and an accumulator. The address register may store a memory address from which data is to be read or to which data is to be written. The program counter may store a memory address in which an instruction that is to be executed next is stored. The data register may store data read from the memory. The instruction register may store an instruction that is read from the memory. The register 110 may include, for example, various registers that have different functions other than those mentioned above.

The register 110 may include a data type field and a data field. The data type field stores data type information, and the data field stores the data. In this example, the data type represents the type of data stored in the data field. For example, the data type may include the size of the data and/or the signed/unsigned type of the data.

Figure 2:
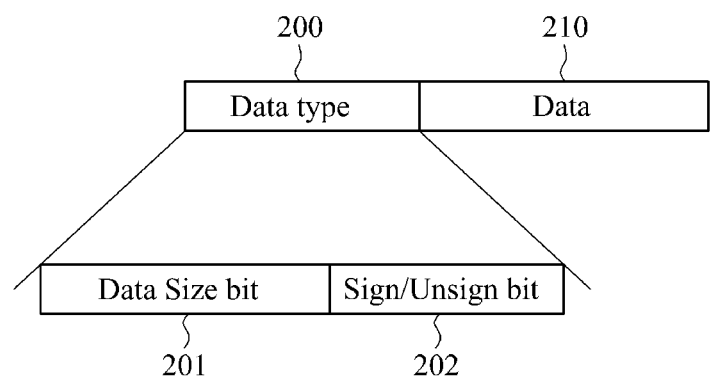
FIG. 2 is a diagram illustrating an example of a register.

FIG. 2 illustrates an example of a register. Referring to FIG. 2, the register includes a data type field 200 and a data field 210. A register file may include a plurality of registers, for example, registers 110, which each include a data type field 200 and a data field 210. The data type field 200 may include data size bits 201 and a signed/unsigned bit 202. For example, the data size bits 201 may be used to indicate the size of the data stored in the data field 210. The signed/unsigned bit 202 may be used to indicate whether the data stored in the data field 210 is signed or unsigned. For example, if the signed/unsigned bit is 0, this may indicate that the data stored in the data field 210 is of a signed type, and if the signed/unsigned bit is 1, this may indicate that the data stored in the data field 210 is of an unsigned type.

FIG. 3 is an example table that illustrates data size bits. For example, the table shown in FIG. 3 may include the data size bits when the data field 210 in the example illustrated in FIG. 2 is 32-bit wide.

Referring to FIGS. 2 and 3, for example, if the data field 210 is 32-bit wide, the size of the data to be stored in the data field may include 8-bit wide data, 16-bit wide data, 24-bit wide data, 32-bit wide data, and the like. The data size bits may be set corresponding to the size of each piece of data.

For example, when the data size is 8 bits, the data size bits may be set to '00.' When the data size is 16 bits, the data size bits may be set to '01.' If the data size is 24 bits, the data size bits may be set to '10.' When the data size is 32 bits, the data size bits may be set to '11.'

Hereinafter, it is assumed that the size of the data field 210 is 32 bits, but the size of the data field may be varied. Accordingly, the data size bits may be adjusted based on the size of is the data field.

The ALU 120 is a device that performs an operation. The ALU 120 may perform an arithmetic operation such as an addition operation, a subtraction, and the like. The ALU 120 may perform logical operations such as an AND operation, an OR operation, and the like.

The ALU 120 may perform an operation on data stored in the data field 210 based on the data type bits stored in the data type field 200.

For example, the ALU 120 may perform an operation using the signed/unsigned bit included in the data type field 200. In the example of a signed type, the ALU 120 may perform an operation on the data in a manner suitable for signed data. Alternatively, in the example of an unsigned type, the ALU 120 may perform an operation on data in a manner suitable for unsigned data.

The CU 130 interprets a program instruction and controls the ALU 120, the register 110, and an input/output device based on the interpreted instruction. That is, the CU 130 controls the overall operation of the processor 100.

The CU 130 may compute the data type bits including the data type including the size of the data and/or the signed/unsigned type of the data. The CU may store the generated data type bits in the data type field 200 of the register 110.

When data is output as the result of an operation on data of a first type and data of a second type, the CU 130 may determine the output data based on the input operands and their data types. In addition, the CU 130 may store the data type bit corresponding to the computed data type in the data type field of the output data. A description of storing the data type bit is further described with reference to FIGS. 4 and 5. In some embodiments, functions of the CU 130 may be integrated with the ALU 120. For example, the ALU 120 may perform an operation on two pieces of data and determine the type of the output data.

The CU 130 may compute the data type bits based on an instruction that has an explicitly or implicitly given data type. For example, if an instruction is to read data of a given data type from the main memory and store the read data in the data field 210 of the register 110, the CU 130 may store the read data in the data field 210 of the register 110 and store the data type bits corresponding to the data type in the data type field 200 of the register 110. The description of the above operation is further described with reference to FIG. 6.

As another example, if the instruction is to change data stored in the data field to a given data type, the CU 130 may change the stored data to the data of the given data type, store the changed data in the data field 210 of the register 110, and set the data type bits of the changed data to the given data type in the data type field 200 of the register 110. The description of the above operation is further described with reference to FIG. 7.

The CU 130 may explicitly recognize the type of data stored in the data field based on the data type bits. For example, if the data field is 32 bits wide and the stored data is an 8-bit type, the CU 130 may recognize that the size of the data is 8 bits based on the data size bits. That is, the CU 130 is able to determine that only 8 bits are data from among the data field and the remaining 24 bits are not to be used for computation. In addition, the CU 130 may recognize whether the data is of a signed type or an unsigned type based on the signed/unsigned bit.

The CU 130 may control the ALU 120 to perform an operation on data based on the signed/unsigned bit stored in the data type field 200. For example, if the signed/unsigned bit indicates a signed type, the CU 130 may control the ALU 120 to perform an operation on data in a manner suitable for signed data. In the alternative, if the signed/unsigned bit indicates an unsigned type, the CU 130 may control the ALU 120 to perform an operation on data in a manner suitable for unsigned data.

As described herein, the processor 100 uses the register 110 including the data type field and the data field to efficiently perform an operation on data.

The processor 100 may identify the size of data stored in the data field using the data type bits. The processor 100 may recognize the size of data stored in the data field even when the size of the stored data is smaller than the width of the data field. Thus, the processor 100 may recognize the size of the data without additionally extracting the data from the data field even when the size of the stored data is smaller than the size of the data field. In terms of software implementation, a program instruction for additional extraction is not required, and thus, the overall program may be simplified.

Figure 4:
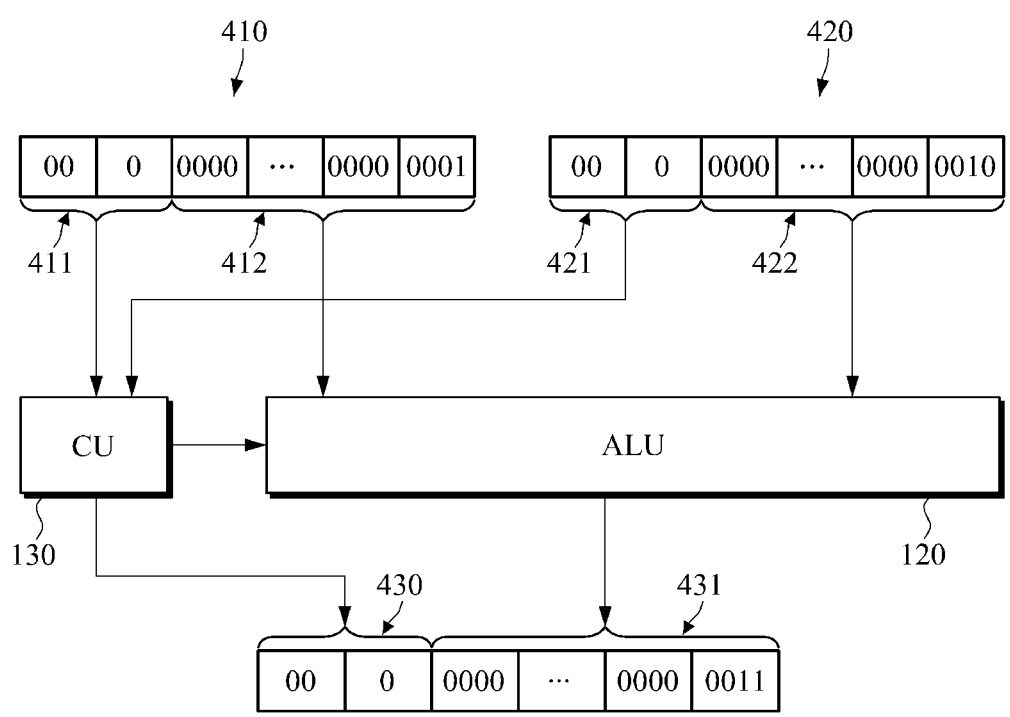
FIG. 4 is a diagram illustrating another example of a processor.

FIG. 4 illustrates another example of a processor. Referring to FIG. 4, the processor includes a first register 410, a second register 420, an ALU 120, and a CU 130.

The first register 410 includes a data type field 411 and a data field 412. In this example, the data field is 32 bits wide, and the data type field is three bits wide. The data type field 411 includes data size bits and a signed/unsigned bit. In this example, the data size bits are set to '00,' and the signed/unsigned bit is set to '0.' Accordingly, the data stored in the data field 412 is 8 bits wide and of a signed type. The data field 412 may store a bit string of '0000 0001' as data, and the rest of the data field 412 (i.e. the remaining 24 bits of the data field) may be filled with, for example, the same bit as the first bit '0' of the data bit string '0000 0001.'

The second register 420 includes a data type field 421 and a data field 422. The data type field 421 includes data size bits and a signed/unsigned bit. In this example, the data size bits are set to '00,' and the signed/unsigned bit is set to '0.' Accordingly, data stored in the data field 422 is 8 bits wide and of a signed type. The data field 421 may store a bit string of '0000 0010' as data, and the rest of the data field 421 may be filled with, for example, the same bit as the first bit '0' of the data bit string of '0000 0010.'

Hereinafter, it is assumed that the ALU 120 adds the data stored in the respective first and second registers 410 and 420. However, it should be understood that the example illustrated in FIG. 4 is applicable to both arithmetic and a logical operations performed by the ALU 120.

In response to an instruction for computing one piece of data by adding together the data stored in the first register 410 and the data stored in the second register 420, the CU 130 may control the ALU 120 to perform an operation on the data stored in the respective first and second registers 410 and 420. In addition, the CU 130 may compute the data type of the output data based on the data types stored in the respective first and second registers 410 and 420. The CU 130 may then store the data type bits corresponding to the computed data type in the data type field of the output data.

For example, the CU 130 may control the ALU 120 to add the data stored in the data field 412 of the first register 410 and the data stored in the data field 422 of the second register 420 and output the resultant added data. The CU 130 may store the output data in a data field 431. For example, the CU 130 may determine to maintain the data type of the output data because the data type stored in the first register 410 is the same as the data type stored in the second register 420. Thereafter, the CU 130 may store the data type bits in the data type field 430 of the output data. For example, the data type field 430 may contain the data size bits '00,' and the signed/unsigned bit '0.' An example involving data of different data types is further described with reference to FIG. 5.

As described above, the processor shown in the example illustrated in FIG. 4 performs an operation on data efficiently based on the data type bits.

Figure 5:
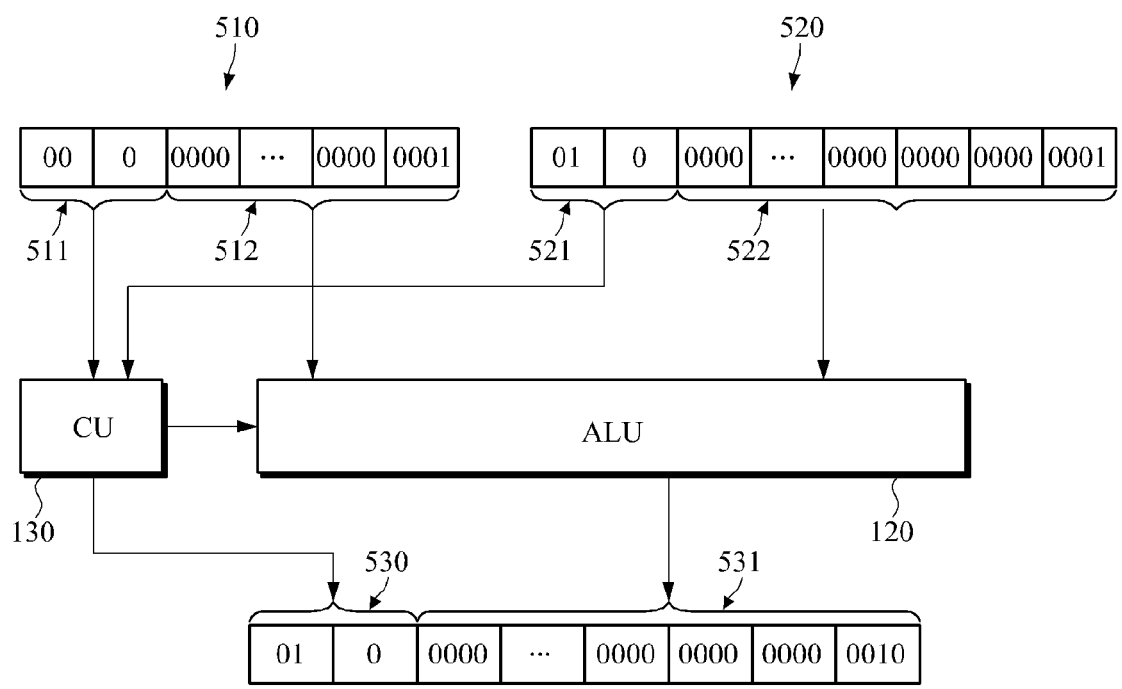
FIG. 5 is a diagram illustrating another example of a processor.

FIG. 5 illustrates another example of a processor. Referring to FIG. 5, the processor includes a first register 510, a second register 520, an ALU 120, and a CU 130.

The first register 510 includes a data type field 511 and a data field 512. In this example, the data field is 32 bits wide, and the data type field is three bits wide. In this example, the data type field 511 includes two data size bits and a signed/unsigned bit. In this example, the data size bits are set to '00,' and the signed/unsigned bit is set to '0.' Accordingly, data stored in the data field indicates an 8-bit signed type. The data field 512 may store a bit string of '0000 0001' as data, and the remaining 24 bits of the data field 512 may be filled with, for example, the same bit as the first bit '0' of the data bit string of '0000 0001.'

The second register 520 includes a data type field 521 and a data field 522. In this example, the data type field includes two data size bits and a signed/unsigned bit. In this example, the data size bits are set to '01,' and the signed/unsigned bit is set to '0.' Accordingly, data stored in the data field 522 is of a 16-bit signed type. The data field 521 may store a bit string of '0000 0000 0000 0001' as data, and the remaining 16 bits of the data field 521 may be filled with, for example, the same bit as the first bit '0' of the data bit string of '0000 0000 0000 0001.'

Hereinafter, it is assumed that the ALU 120 adds the data stored in the first register 510 and the data stored in the second register 520. However, it should be understood that the example illustrated in FIG. 5 is applicable to both arithmetic and logical operations performed by the ALU 120.

In response to an instruction for computing one piece of data by adding the data stored in the first register 510 and the data stored in the second register 520, the CU 130 may compute the data type of the output data based on the data types stored in the respective first and second registers 510 and 520. When the two pieces of data are of different data types, the CU 130 may determine the output data type to be the data type of the larger data, the smaller data, or a data type different from both of the source data types. Thereafter, the CU 130 may store the data type bits corresponding to the computed data type in the data type field of the output data.

For example, the CU 130 may control the ALU 120 to add the data stored in the data field 512 of the first register 510 and the data stored in the data field 522 of the second register 520. The CU 130 may store the resultant output data in the data field 531. If the data type of the output data is set to the data type of the larger data from among the two pieces of data, the CU 130 may set the data type of the output data to '01 0.' That is, the output data has '01' as the data size bits and '0' as the signed/unsigned bit. The CU 130 may then store the data type bits in the data type field 530 of the output data. Thus, the data type field 530 includes the data size bits '01' and the signed/unsigned bit '0.'

In contrast, if the data type of the output data is set to the data type of the smaller data from among the two pieces of data, the CU 130 may store the data size bits '00' and a signed/unsigned bit '0' in the data type field 530 of the output data.

Accordingly, the processor shown in the example illustrated in FIG. 5 is able to perform an operation efficiently based on the data type bits.

Figure 6:
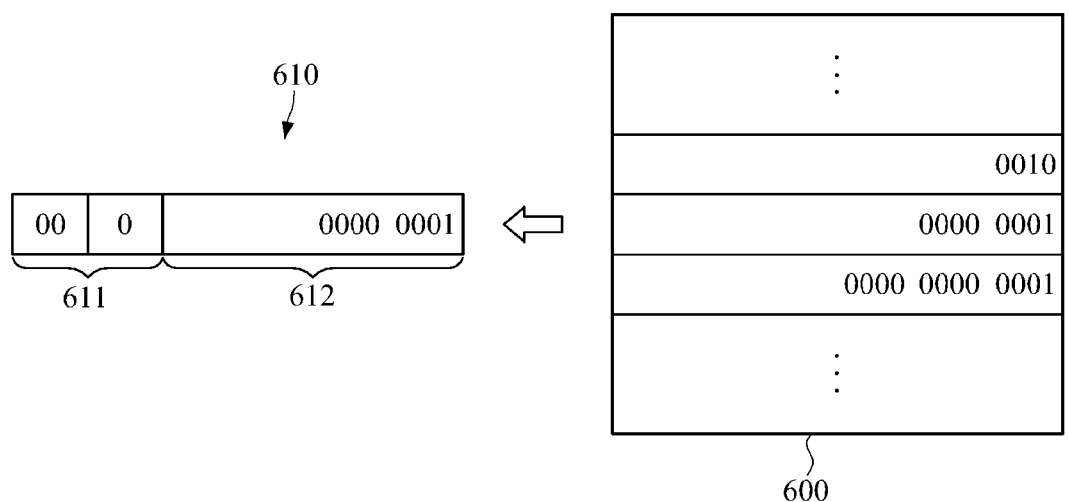
FIG. 6 is a diagram illustrating another example of a processor.

FIG. 6 illustrates another example of a processor. The CU 130 reads data from a main memory 600 and stores the data that is read in the data field 612 of a register 610 in response to an instruction. The CU 130 may store the data type field corresponding to an explicitly or implicitly given data type in the data type field 611 of the register 610.

An instruction having an implicitly given data type may be represented as "load signed short" in a programming language. Based on the instruction, the CU 130 may read data of a signed short type, and store the read data in the register 610.

For example, if the implicitly given data type is a signed 8-bit type, the CU 130 may read 8 bits of data from the main memory 600. In this example, the CU 130 may then store the read data in the data field 612 of the register 610, and store the data type bits '00 0' corresponding to the given data type in the data type field 611. The data type may be set to various data sizes such as 24 bits, 32 bits, and the like.

Figure 7:
FIG. 7 is a diagram illustrating another example of a processor.

FIG. 7 illustrates another example of a processor. In this example, the CU 130 changes the data type of the data stored in the data field to an explicitly given data type. The CU 130 may store the data type field corresponding to the given data type in the data type field.

The instruction having an explicitly given data type may be represented as "MOV rd, rs, type" in a programming language. Based on the instruction, the CU 130 may change the data stored in rs to data of the given data type, and move the changed data to rd. In this example, rs and rd may correspond to registers that are the same as each other.

For example, if the requested data type is a signed 16-bit type, the CU 130 may instruct the ALU 120 to convert the data '0000 0001' stored in the data field 712 to 16-bit signed data '0000 0000 0000 0001.' The CU 130 may then store the converted data to the data field 722. In addition, the CU 130 may change the data type bits in the data type field 710 to the data type bit of the converted data stored in the data type field 720. For example, the CU 130 may change the existing data size bits '00' to the data type bits '01' of the converted data. In addition, the CU 130 may maintain the signed/unsigned bit stored in the signed/unsigned field 711.

The instruction may be to change the type of the stored data or to move the converted data to a different location. For example, the CU 130 may store the converted data and the data type bits of the converted data in the original register or in another register. The data type may be set to various data sizes such as 24 bits, 32 bits, and the like.

Figure 8:
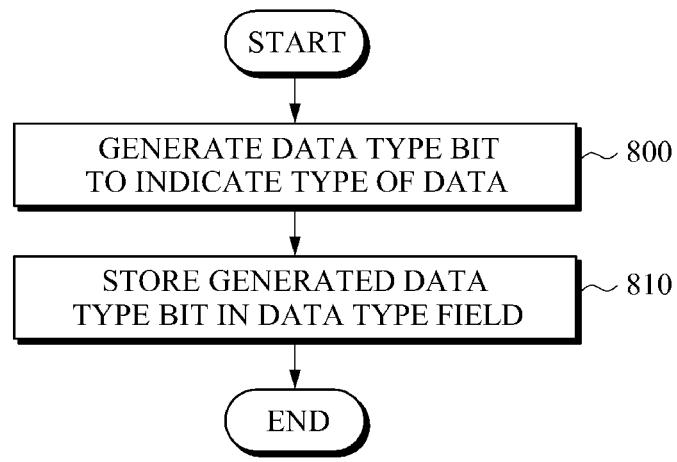
FIG. 8 is an example flowchart of a method of controlling a processor.

FIG. 8 illustrates an example of a method of controlling a processor. Referring to FIGS. 1 and 8, the processor 100 generates the data type bits to indicate the data type including the size and/or the signed/unsigned state of the data, in 800. The processor 100 stores the generated data type bits in a data type field of a register, in 810.

The processor 100 may generate the data type bits based on an instruction that has an explicitly or implicitly given data type. In this example, the instruction may be an instruction for reading data of the given data type and storing the data in a data field, and/or for converting stored data to data of the given requested data type.

When one piece of data is output as a result of an operation on data of a first type and data of a second type, the processor 100 may determine the data type of the output data based on the data types of the input operands. The processor 100 may then store the output data in the data field, and generate the data bits to indicate the data type of the output data based on the determined data type.

The processor 100 may recognize the type of data stored in the data field based on the data type bits.

The method of controlling the processor shown in the example illustrated in FIG. 8 may perform a data operation effectively using the register including the data type field.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor comprising:
a register comprising a data type field and a data field; and
a control unit configured to generate data type bits that indicate a data type, wherein the data type includes a size of the data and/or a signed/unsigned type of the data and to store the generated data type bits in the data type field.

2. The processor of claim 1, wherein in response to one piece of data being output as a result of an operation performed on data of a first type and data of a second type, the control unit determines the data type of the output data based on the data types of the input data.

3. The processor of claim 2, wherein the control unit stores the output data in the data field and generates the data type bits of the output data based on the determined data type.

4. The processor of claim 1, wherein the control unit generates the data type bits based on an instruction that has an explicitly or implicitly given data type.

5. The processor of claim 4, wherein the instruction includes at least one of an instruction for reading data of a given data type and storing the data in the data field, and an instruction for changing stored data to data of a requested given data type.

6. The processor of claim 1, wherein the data type bits include at least one of data size bits indicating the size of the data and a signed/unsigned bit indicating whether the data is signed or unsigned.

7. The processor of claim 1, wherein the control unit recognizes the data type of data stored in the data field based on the data type bits.

8. A register comprising:
a data field configured to store data; and
a data type field, configured to store data type bits that indicate a data type of the data, wherein the data type includes a size of the data and/or a signed/unsigned state of the data.

9. The register of claim 8, wherein the data type bits includes at least one of data size bits indicating the size of the data and a signed/unsigned bit indicating whether the data is signed or unsigned.

10. A method of controlling a processor, the method comprising:

generating data type bits to indicate a data type, wherein the data type includes a size of data stored in a data field of a register and/or a signed/unsigned state of the data; and storing the generated data type bits in a data type field of the register.

11. The method of claim 10, wherein in response to one piece of data being output as a result of an operation performed on data of a first type and data of a second type, the generating of the data type bits comprises determining the data type of the output data based on the first type and the second type.

12. The method of claim 11, wherein the generating of the data type bits includes storing the output data in a data field and generating data type bits to indicate the data type of the output data based on the determined data type.

13. The method of claim 10, wherein the generating of the data type bits includes generating the data type bits based on an instruction that has an explicitly or implicitly given data type.

14. The method of claim 13, wherein the instruction includes at least one of an instruction for reading data of a given data type and storing the data in the data field, and an instruction for changing stored data to data of h given data type.

15. The method of claim 10, further comprising:
recognizing the data type of data stored in a data field based on the data type bits.

16. The processor of claim 1, wherein the data type bits are two data type bits which represent four different data sizes.

17. The processor of claim 16, wherein the four different data sizes are 8-bit, 16-bit, 24-bit, and 32-bit.

* * * * *